United States Patent [19]

Supik

[11] Patent Number: 4,818,469
[45] Date of Patent: Apr. 4, 1989

[54] SEAL FOR TURNING VALVE BODIES, IN PARTICULAR FOR VALVES IN NUCLEAR-ENGINEERING PLANTS

[75] Inventor: Helmuth Supik, Sarstedt, Fed. Rep. of Germany

[73] Assignee: Deutsche Gesellschaft fur Wiederaufarbeitung von Kernbrennstoffen mbH, Hanover, Fed. Rep. of Germany

[21] Appl. No.: 923,629

[22] Filed: Oct. 27, 1986

[30] Foreign Application Priority Data

Oct. 28, 1985 [DE] Fed. Rep. of Germany ....... 3538306

[51] Int. Cl.$^4$ .......................... G21C 13/02; F16K 5/02
[52] U.S. Cl. ..................................... 376/203; 137/384; 277/DIG. 6; 384/912
[58] Field of Search ................. 277/DIG. 6; 384/912; 137/384; 376/203

[56] References Cited

U.S. PATENT DOCUMENTS

| | | | |
|---|---|---|---|
| 3,297,552 | 1/1967 | Gisser et al. | 384/912 |
| 3,467,356 | 9/1969 | Mueller | 137/384 |
| 3,567,177 | 3/1971 | Mueller | 137/384 |
| 3,959,438 | 5/1976 | Messner | 423/126 |
| 4,056,363 | 11/1977 | Messner | 423/126 |
| 4,216,266 | 8/1980 | Hirschvogel et al. | 428/408 |
| 4,344,633 | 8/1982 | Niksa | 277/DIG. 6 |

FOREIGN PATENT DOCUMENTS

| | | | |
|---|---|---|---|
| 52-27947 | 3/1977 | Japan | 384/912 |
| 54-148952 | 11/1979 | Japan | 277/DIG. 6 |

OTHER PUBLICATIONS

*Grafoil*, Nuclear News, vol. 29, No. 8, p. 64, Jun. 1986.

Primary Examiner—Deborah L. Kyle
Assistant Examiner—Richard L. Klein
Attorney, Agent, or Firm—Helfgott & Karas

[57] ABSTRACT

The seal for turning valve bodies, in particular for valves in radioactive plants, is composed of a molded element of flexible graphite which is coated with a thin, flexible tantalum layer. The tantalum enclosure surrounds the graphite molded element, preferably all around. The tantalum layer is sufficiently thin so that it remains flexible.

7 Claims, 1 Drawing Sheet

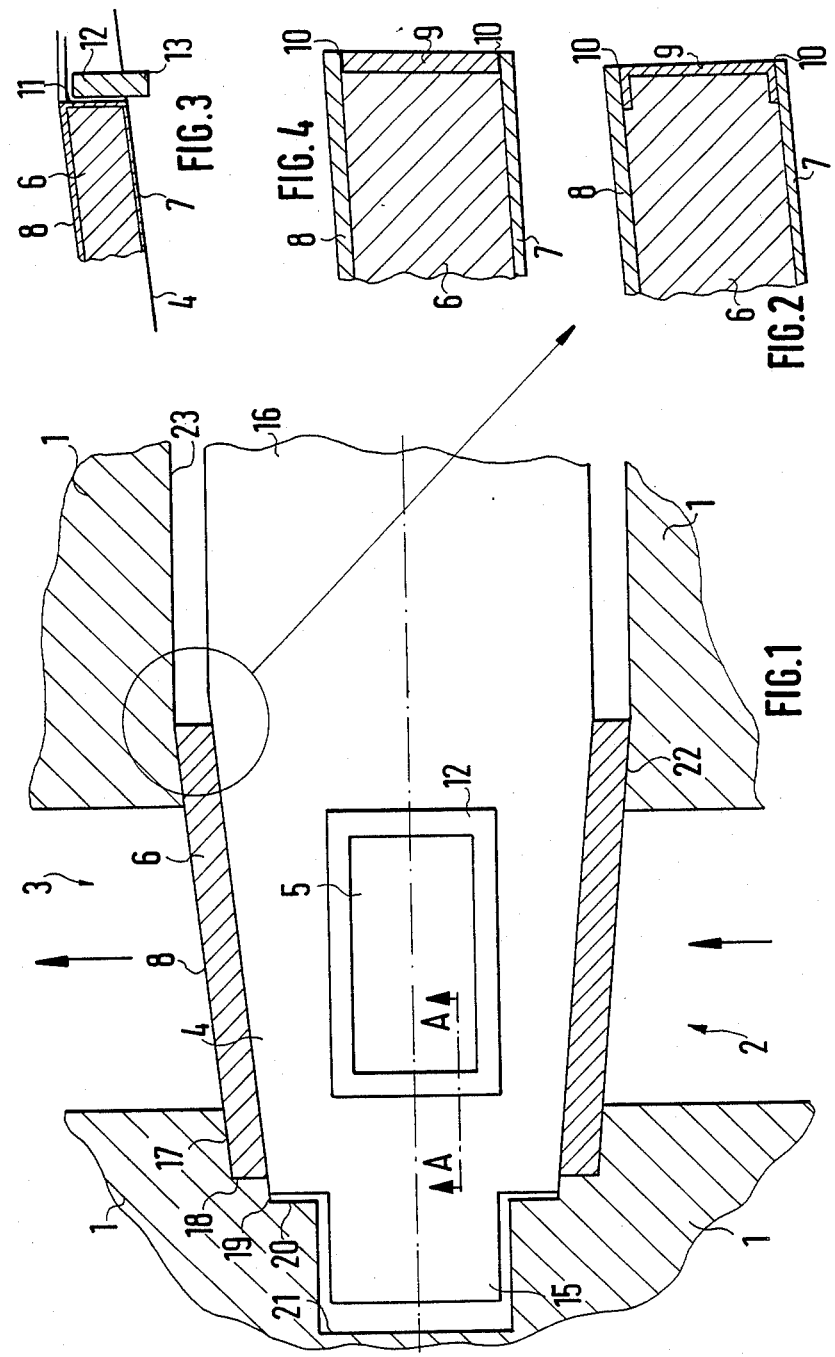

SEAL FOR TURNING VALVE BODIES, IN PARTICULAR FOR VALVES IN NUCLEAR-ENGINEERING PLANTS

The present invention relates generally to a seal for turning valve bodies and more particularly to valves used in nuclear-engineering plants.

From DE-OS No. 2,748,135 it is known to use a flexible graphite laminate as one of the materials for sealings and packings, whereby the laminate is applied to other materials for example a suitable metal. DE-OS No. 2,612,296 and DEP No. 2,039,355 also describe the use of flexible graphite material in the fabrication of seals.

Flexible graphite materials are generally known according to the state of the art and are described, in addition to the aforecited publications, in DE-OS No. 2,855,408 and DE-OS No. 3,117,567. The essential advantages of flexible graphite materials may be found in the following properties:

The materials are liquid- and gas-tight:
they are highly temperature-resistant;
they are resistant to radiation;
They are resistant to most chemicals; and
they have great flexibility and good elasticity and, in some applications, they also act as a self-lubricating seal.

The latter property, however, is coupled with the disadvantage that in a frequently actuated valve, the graphite material is relatively quickly worn off. In general terms, the useful life of such a seal is relatively short. In valves employed in radioactive plants, e.g., in plants for the reprocessing of nuclear fuel, the useful life of the valve is of special importance inasmuch as the replacement of worn-off parts in radioactive plants is very costly because the operation of the plant must be temporarily stopped, which naturally is extremely undesirable.

Sealing materials of polytetrafluoroethylene plastics have not been found satisfactory since PTFE, even though chemically one of the most stable plastics, has very low radiation resistance and also has little resilience. In addition, various copolymers have been developed but their chemical stability, however, is small. For these reasons, it may be said that for the fluidized currents of the Purex process, no plastics are available for seals with a calculable useful life.

It is the purpose of the invention to improve the seal of the type described in such a manner that its useful life is increased.

This purpose is attained by the distinguishing features indicated in the appended claims. Advantageous embodiments and further refinements of the invention also become apparent from the appended claims.

In short, in accordance with the present invention, the seal composed of flexible graphite materials is coated with a thin, flexible layer of tantalum. Tantalum has excellent ductility which is highly desirable for the intended purpose. Tantalum also has very good sliding or lowfriction properties so that a seizing or jamming of the valve body does not occur. In acccordance with the present invention, the tantalum coating layer is sufficiently thin to remain flexible so that the good flexibilty properties of the graphite covered by tantalum are preserved.

It should also be stressed that the seal according to the present invention is likewise well suited for chemical plants in that tantalum is chemically very stable.

In the following description, the invention will be explained by way of an illustrative example of one embodiment wherein like reference characters designate like parts. In the drawing:

FIG. 1 is a fragmentary cross section through a valve with rotating valve body, according to one embodiment of the present invention;

FIG. 2 is an enlarged detail of part of the structure shown in FIG. 1;

FIG. 3 a fragmentary sectional view along line A-A of FIG. 1, and

FIG. 4 a plan view, similar to FIG. 2, of another embodiment of the present invention.

In FIG. 1, the housing and, respectively, the mounting of a valve is indicated schematically by the reference character -1-. The housing -1- has an inlet opening -2- and an outlet opening -3- whereby the flow path can be closed off by a valve cone -4-. The valve cone -4- is provided with a passage opening -5- situated in the flow path and effecting an opening or closing of the valve by turning of the valve cone about its own longitudinal axis.

Over the valve cone -4- is slid a molded element -6- in the shape of a conical cylinder which is provided on either side with recesses -11- (FIG. 3) opposite the passage opening -5-.

The molded element -6- is composed of flexible graphite which, in turn, is coated with a thin, flexible layer of tantalum. The tantalum layer is sufficiently thin so that the flexiblity properties of the graphite are not impaired. The flexible graphite layer may also be built-up of a plurality of thin layers laminated one on top of the other. Cut-outs may be provided in thin, laminated layers of flexible graphite in defined locations in order to create relief surfaces for a more balanced pressure distribution.

From FIGS. 2 to 4 it becomes clear that the tantalum coating is of composed an inner tantalum sleeve -7- and an outer tantalum sleeve -8- which, between them, enclose the graphite molded element -6-. At the end faces, and also additionally in the region of the recess -11-, there are provided tantalum covers -9- which, in sections, are placed between the sleeves -7- and as well as over the end face of the molded element -6-. Complete sealing is obtained because the covers -9- are welded (at -10-) together with the inner and outer sleeves -7- and -8-. Advantageously, all welding seams -10- are produced by the precisely focusable electron beam welding process, known in itself. The sealing of the recesses -11- opposite the passage openings -5- is obtained in the same manner as the sealing of the end faces as shown in FIG. 2. Thus, the graphite molded element -6- is hermetically encapsulated within a thin tantalum enclosure. The molded element -6- encapsulated in this manner is fixed on the valve cone -4- by means of a frame-like holding device -12-. Thereby is thus obtained a fixing of the molded element -6- in both the axial direction and the direction of turning. Around the passage openings -5- arranged on either side of the valve cone -4- extends a groove -13- into which is inserted the frame-like holding device -12-. Securing thereof is obtained by a press fit. In the embodiment illustrated, the passage openings -5- and holding device -12- appear rectangular in plan view. Evidently, circular, oval or other openings may be provided.

In the exemplifying embodiment shown in FIG. 2, the end face cover -9- is flanged so that it overlaps the graphite molded element -6-. In the embodiment illustrated in FIG. 4, however, the covers are annular disks or rings which without any overlapping are welded to the sleeves -7- and -8- at the welds -10-.

In the embodiment represented in FIG. 1 there is also shown in greater detail the arrangement of the valve connected with the seal according to the present invention. At its smaller diameter front end, the valve cone -4- is provided with a cylindrical section -15- which penetrates a cylindrical housing opening -20- (!). Starting from the inlet and outlet openings -2- and -3-, respectively, housing -1- is provided, in the region of the front end of the valve cone -4- with a first conical valve seat -17- in which is guided the molded element -6- of the seal in accordance with the present invention. This is followed, by way of a transverse step or shoulder step -18-, by a second conical valve seat -19- with a smaller diameter, the second diameter corresponding approximately to the diameter there of the valve cone -4-. Thereafter follows a further step or transverse shoulder -20- and, successively, a cylindrical housing recess -21-.

On the other side of the valve cone -4- there is also provided a conical valve seat -22- in which is guided the other end of the seal. This is followed by a cylindrical opening -23- of the housing -1- whose diameter is larger (by approximately the wall thickness of the seal -6-) than the diameter of the rear cylindrical portion -16- of the valve cone -4- with the seal mounted on it can slide axially (from the right to the left as shown in FIG. 1).

A preferred field of application of the present invention is as a seal for cone valves in the fluidized currents of the Purex process whereby the operational components are comprised of radiation-resistant, flexible and corrosion-resistant materials. By means of the seal according to the present invention there can be achieved a definite increase in service life and also increased maintenance and replacement intervals.

Another preferred filed of application of the present invention is the utilization of the seal in chemical plants, e.g., in case of chemicals which do not attack tantalum. In $HNO_3$ and many other chemicals, tantalum is an absolutely corrosion-resistant material. In contrast to plastics, the flexible graphite enclosed by tantalum retains its characteristics, even at temperatures exceeding 150° C. It does not liquefy and does not change chemically, even on inclusion in tantalum.

All technical details contained in the patent claims, the description and the drawing are essential parts of the invention, each by itself and also in any combination whatever.

I claim:

1. In combination with a value in a nuclear plant, comprising a housing and a valve body, a seal composed of a molded flexible graphite element positioned on said body to seal said valve body against said housing, said element being coated with a thin flexible layer of tantalum.

2. The combination of claim 1 wherein the element is a hollow cone open at both ends, said cone having inner and outer exposed surfaces, said layer coating all of said exposed surfaces.

3. In combination with a valve in a nuclear plant, comprising a housing and valve body, a seal composed of a molded flexible graphite element positioned on said body to seal said valve body against said housing, said element being formed of a hollow cone open at first and second oppositely disposed diametrically different flat annularly shaped end faces, and a thin flexible tantalum layer coating all of the exposed surfaces, said layer including a conically shaped first section coating the outer conical surface of the element, a conically shaped second section coating the inner conical surface of the element, an annularly shaped third section coating the first end face and an annularly shaped fourth section coating the second end face.

4. The combination of claim 3 wherein the third and fourth sections are each welded to the first and second sections.

5. In combination with a valve in a nuclear plant, said valve including a housing with oppositely disposed inlet and outlet ports and a conically shaped valve cone movable in the housing, the cone having a passageway which can be moved into alignment with the ports to open the valve and which can be moved out of alignment with the ports to close the valve, a seal composed of conically shaped molded flexible graphite element slid over the cone and having oppositely disposed openings which are aligned with opposite ends of the passageway, and a thin flexible layer of tantalum coating all surfaces of the element, and holding means disposed between the coated element and the valve cone to prevent the coated element from moving relative to the cone when the cone is moved to open and close the valve.

6. The combination of claim 5 wherein the holding means includes first and second holding devices, each device being disposed adjacent and between a corresponding opening in the coated element and the corresponding aligned end of the passageway.

7. The combination of claim 6 wherein the valve cone has a first and second oppositely disposed grooves in its outer surface, each groove being disposed peripherally around the corresponding one of the opposite ends of the passageway, and the coated element has first and second oppositely disposed recesses, each recess being disposed in alignment with the corresponding groove, each device extending between and engaging the corresponding recess and the corresponding groove.

* * * * *